June 13, 1961 S. SODERBERG ET AL 2,988,105
THROTTLING VALVE
Filed June 18, 1958

INVENTORS.
BY Sten Soderberg
John T. Muller

ATTORNEYS

2,988,105
THROTTLING VALVE
Sten Soderberg and John T. Muller, Nutley, N.J., assignors to Leslie Co., Lyndhurst, N.J., a corporation of New Jersey
Filed June 18, 1958, Ser. No. 742,815
6 Claims. (Cl. 137—329.03)

This invention relates to valves for controlling the flow of fluids and more particularly to a throttling valve adapted for use in controlling the flow of fluid under high pressure.

In valves in which throttling is effected by the seating surface of a movable plug and the seating surface of the valve body, resulting erosion of these surfaces produces a condition under which the valve cannot be shut off tightly after the valve has been in use for a relatively short period. Various methods of protecting these surfaces and various constructions to permit renewal of the seating surface of the valve body have been proposed.

In the present invention we provide a floating sleeve surrounding the valve plug or stem, and the throttling action is performed between the lower edge of this sleeve and an opening in a cylinder surrounding it, the opening communicating with the outlet side of the valve body. This construction practically eliminates erosion of the seating surfaces thereby increasing the life of the valve; it reduces clearance leakage, thereby increasing the rangeability of the valve without the use of lapped fits or extremely close tolerances; and it permits replacement of the seat ring in the valve body without removing the valve from the line.

These, and other advantages of the improved valve construction, will be apparent from the following specification when read in connection with the accompanying drawing which illustrates one embodiment of the invention. In this drawing.

Figure 1:
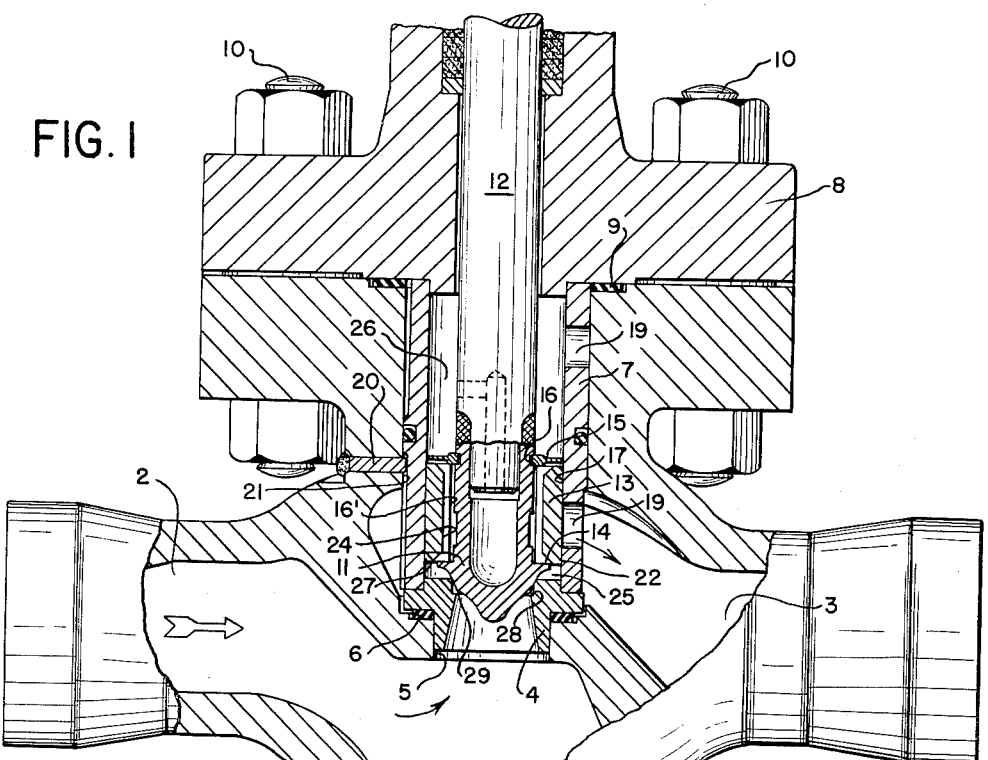
FIG. 1 is a side elevation, with parts shown in vertical section.
Figure 2:
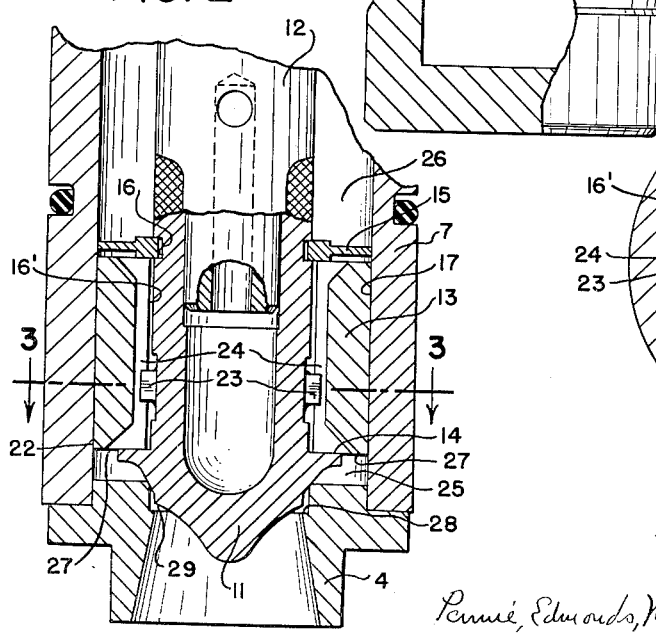
FIG. 2 is a vertical, sectional view of parts of the valve taken in a plane at right angles to FIG. 1.

Referring to the drawing, the valve body 1 is provided with an inlet side 2 and an outlet side 3. A replaceable valve seat 4 is arranged in passage 5 between the inlet and outlet sides of the valve. Gasket 6 is arranged between the valve seat member 4 and the valve body, to seal the joint to prevent leakage. A cylinder 7 fits into the central bore in the upper portion of the valve body. Bonnet flange 8 is arranged on the valve body with a gasket 9 between the bonnet flange and the valve body to seal the joint. Bonnet bolts 10 secure the bonnet flange to the valve body. Cylinder 7 is of such length that when the bonnet bolts are tightened to compress gasket 9 and form a tight fit, cylinder 7 engaging valve seat 4 also causes gasket 6 to be compressed thus forming tight seals between the valve body and the bonnet flange and between valve seat 4 and the valve body.

A valve plug 11 is mounted in the central bore of the valve body and cooperates with the valve seat. The plug is connected to a stem 12 which extends from the valve body, and is operatively connected to valve operating means (not shown). Such operating means may be manual, pneumatic, electric, hydraulic, or of other suitable means.

A sleeve 13 fits freely around valve plug 11 and snugly but freely in the bore of cylinder 7. The lower face of sleeve 13 rests against a shoulder 14 of valve plug 11. The sleeve is held in position by a retaining ring 15 inserted in a groove 16 in valve plug 11 close to the upper face of sleeve 13. The clearance 16' between the inside diameter of sleeve 13 and the valve plug 11 is somewhat greater than the clearance 17 between the outside diameter of the sleeve and the bore of cylinder 7. This insures sufficient freedom for valve plug 11 to seat centrally in valve seat 4 although valve seat 4 and cylinder 7 may be slightly misaligned due to reasonable clearances and manufacturing tolerances. It also insures sufficient lateral movement of sleeve 13 to enable it on contact the inner wall of cylinder 7 without interference of valve plug 11.

A port 19 in the wall of cylinder 7 permits the discharging of fluid passing through the valve. It is arranged to face in the direction of outlet portion 3 by dowel pin 20. Pin 20 fits into slot 21 in cylinder 7. The port 19 may be made of a shape or contour required to give any desired throttling characteristic, for example: "quick acting," "linear" or "equal percentage." Control of the flow of the fluid is effected by throttling edge 22 of sleeve 13 as it slides along the inner wall of cylinder 7 and uncovers more or less of the area of port 19.

Figure 3:
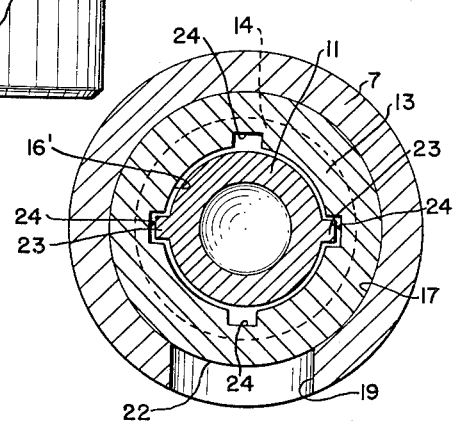
FIG. 3 is a horizontal, sectional view on line 3—3 of FIG. 2.

The valve plug 11 is provided with one or more indexing keys 23 (see FIG. 3) which fit into one or more of several indexing key slots 24 arranged in sleeve 13 for the purpose of holding the sleeve 13 in a fixed position radially and prevent it from rotating or spinning. The key slots also provide communication between spaces 25 and 26, above and below the sleeve 13, for equalization of pressure in these spaces.

Sleeve 13 may thus be adjusted circumferentially to several positions as wear occurs on its lower throttling edge 27 in the portion aligned with port 19. A new throttling edge is thus presented for use and the useful life of sleeve 13 increased. As shown, we provide for four positionings of the sleeve, but the number may be greater, depending on the circumference of the sleeve in relation to the width of the port. It will also be apparent that when the edge at one end of the sleeve has been used in all of its circumferential adjustments, the sleeve may be arranged in an inverted position to provide a new throttling edge which will provide service equal to that obtained from the original.

Similarly the cylinder 7 may be provided with two ports 19 arranged in the same position circumferentially and equally spaced from each end. When two ports are provided, inner ends of slots 21 must be equidistant from the ends of the cylinder. Then when the throttling edge of one port 19 becomes worn, the cylinder may be reversed to bring the other port into alignment with the outlet side of the valve casing.

In operation, erosion of valve seat member 4 and plug 11 is substantially eliminated. When the valve plug is seated against valve seat, the throttling edge is an appreciable distance below the lower edge of port 19. When the valve plug leaves valve seat with the port completely covered, the pressure in spaces 25 and 26 immediately builds up to a value equal to that of the pressure in inlet portion of the valve body. The sleeve 13 is forced against port 19 by the pressure difference across it, acting on the full port area. This provides a self-sealing feature which keeps the so-called "clearance leakage" practically at zero. There is no perceptible flow of fluid until the throttling edge of the sleeve reaches the lower edge of port 19 and begins to uncover it. Since at this time the valve plug is a considerable distance away from valve seat and since the pressure drop across same is practically nil and velocity of the fluid is low, there is no erosive action on the seating surfaces of the valve seat or the valve plug at the low flow conditions. The area of the valve seat 4 in relation to the area of port 19 is such that even at higher flows, the pressure drop across the former is very small and the major part of the drop occurs across the latter.

Further, by arranging a step 28 adjacent to the seating surface of valve seat 4 and step 29 just below the seating surface of valve plug 11, the fluid when flowing at higher velocities is deflected from said seating surfaces, eliminating scouring action and impact and resulting erosion and wear.

As there is no perceptible flow of fluid until the throttling edge of sleeve 13 has reached the lower edge of port 19 and begins to uncover same, the flow, due to throttling edge and port action, is controllable. Therefore, the rangeability of this valve can be considered infinite.

When valve plug 11 is seated against valve seat 4, an upward stem thrust is caused by the pressure in inlet portion of the valve body on valve plug over an area equal to that of the bore of valve seat 4. When the valve is opened, the pressure in spaces 25 and 26 at once equals that in inlet portion 2 and thus balance one another. This pressure is acting in upwards direction on the area of the stem and since this area is equal to that of the seat area, the upwards thrust remains unchanged. As there is very little pressure drop across valve seat, even at higher flows, there is therefore very little change in the upward stem thrust from fully closed to fully open valve, which insures high stability and accurate valve positioning.

We claim:

1. A valve comprising a valve body having an inlet side and an outlet side, a valve seat between the inlet side and the outlet side, a valve member cooperating with the valve seat, a valve stem operatively associated with the valve member, a sleeve having a bore slightly greater than the outside diameter of the valve stem surrounding and axially locked to the stem so as to be movable axially with it when the valve member moves toward and away from the valve seat, and a cylinder in the valve body closely surrounding the valve sleeve, said cylinder having a port on only one side thereof facing the outlet side of the valve body, the sleeve closing the port when the valve member is within a predetermined distance of its seat and exposing the port as the valve member moves beyond said predetermined distance from its seat, the clearance between the bore of the sleeve and the outside of the valve stem being greater than the clearance between the sleeve and the cylinder.

2. A valve in accordance with claim 1 in which the clearance provided between the valve stem and the sleeve permits an equalizing pressure to be created above and below the sleeve when the valve moves away from its seat and prior to the opening of the port, and a seal is provided between the portion of the valve stem above the sleeve and the valve body to prevent escape of fluid passing through said clearance.

3. A valve in accordance with claim 1 in which the valve member and sleeve are provided with cooperating slots and a key to prevent axial rotation of the sleeve and to permit the sleeve to be adjusted circumferentially to provide a plurality of throttling edges while nevertheless maintaining the clearance between the sleeve and the cylinder and the freedom of the sleeve axis to move relative to the cylinder axis.

4. A valve in accordance with claim 1 in which the cylinder is provided on the same side with an additional port so that the two ports are spaced equidistant from the ends of the cylinder to permit reversal of the cylinder when the throttling edge of one port becomes worn.

5. A valve in accordance with claim 1 in which the valve seat is provided with an inwardly projecting flow-deflecting shoulder adjacent the upstream side of its seating surface, and the valve member is provided with an outwardly projecting flow-deflecting shoulder adjacent the upstream side of its seating area.

6. A valve comprising a valve body having an inlet side and an outlet side, a valve seat between the inlet side and the outlet side, a gasket between the valve seat and the valve body, a valve member cooperating with the valve seat, a valve stem associated with the valve member, a bonnet flange on the valve body through which the valve stem extends, a gasket between the valve body and the bonnet flange, means for securing the bonnet flange to the valve body, a sleeve having a bore slightly greater than the outside diameter of the valve stem surrounding and axially locked to the stem so as to be movable axially with it when the valve member moves toward and away from the valve seat, and a cylinder in the valve body closely surrounding the valve sleeve, said cylinder having a port on only one side thereof facing the outlet side of the valve body, the sleeve closing the port when the valve member is within a predetermined distance of its seat and exposing the port as the valve member moves beyond said predetermined distance from its seat, the cylinder having one end in engagement with the bonnet flange and one end in engagement with the valve seat, the cylinder being of such length that when the securing means of the bonnet flange is tightened the gasket between the bonnet flange and the valve body and the gasket between the valve body and the valve seat member are independently compressed, the clearance between the bore of the sleeve and the outside of the valve stem being greater than the clearance between the sleeve and the cylinder.

References Cited in the file of this patent

UNITED STATES PATENTS

| | | |
|---|---|---|
| 806,309 | White | Dec. 5, 1905 |
| 942,045 | Ashley | Dec. 7, 1909 |
| 1,235,221 | Marsh | July 31, 1917 |
| 1,540,954 | Rockwell | June 9, 1925 |
| 1,635,875 | Albrecht | July 12, 1927 |
| 2,039,220 | Hegge | Apr. 28, 1936 |
| 2,649,275 | Noyes | Aug. 18, 1953 |
| 2,886,283 | Natho | May 12, 1959 |